(No Model.) 3 Sheets—Sheet 3.
W. J. FETTER.
CORN HARVESTING AND HUSKING MACHINE.
No. 307,108. Patented Oct. 28, 1884.
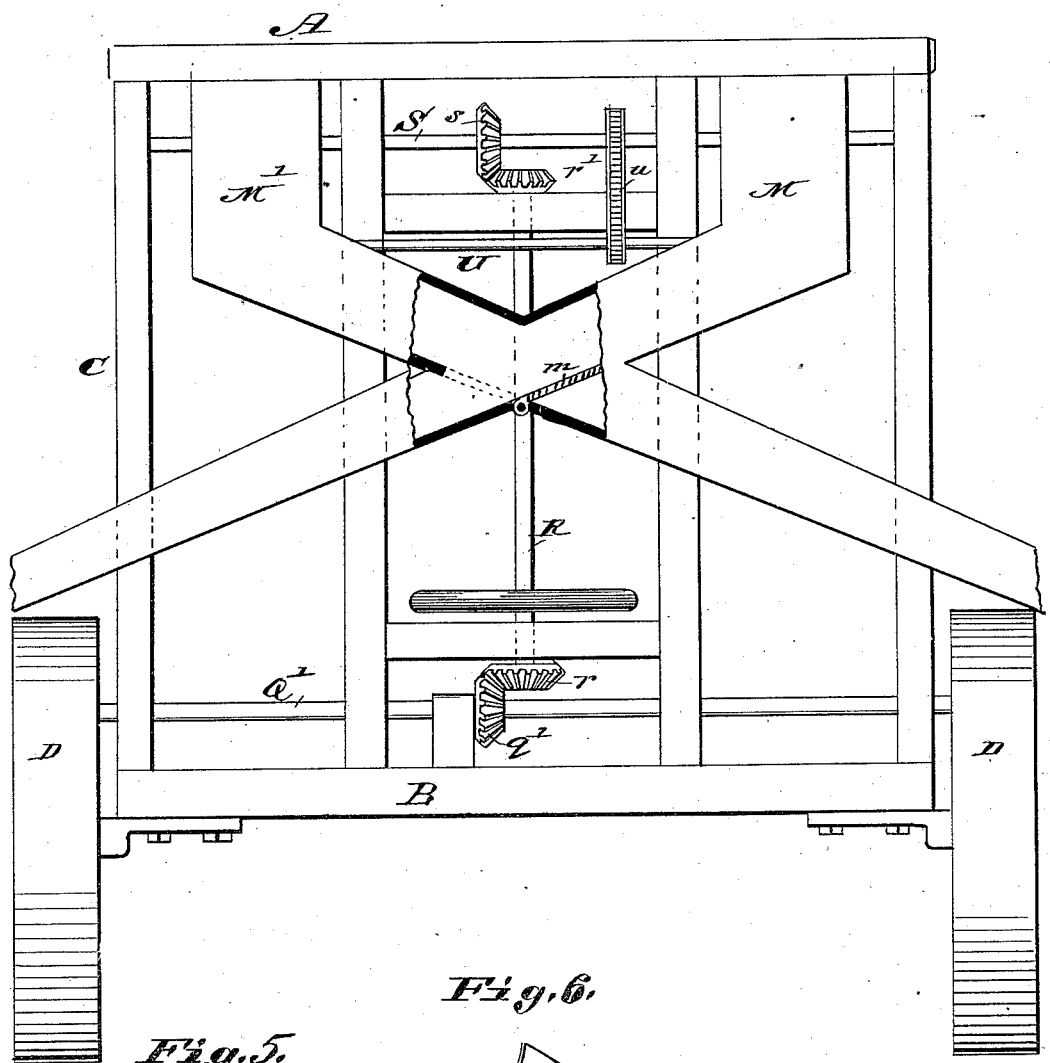
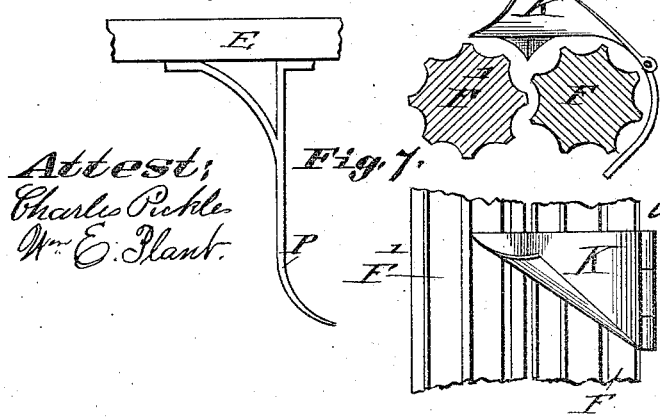

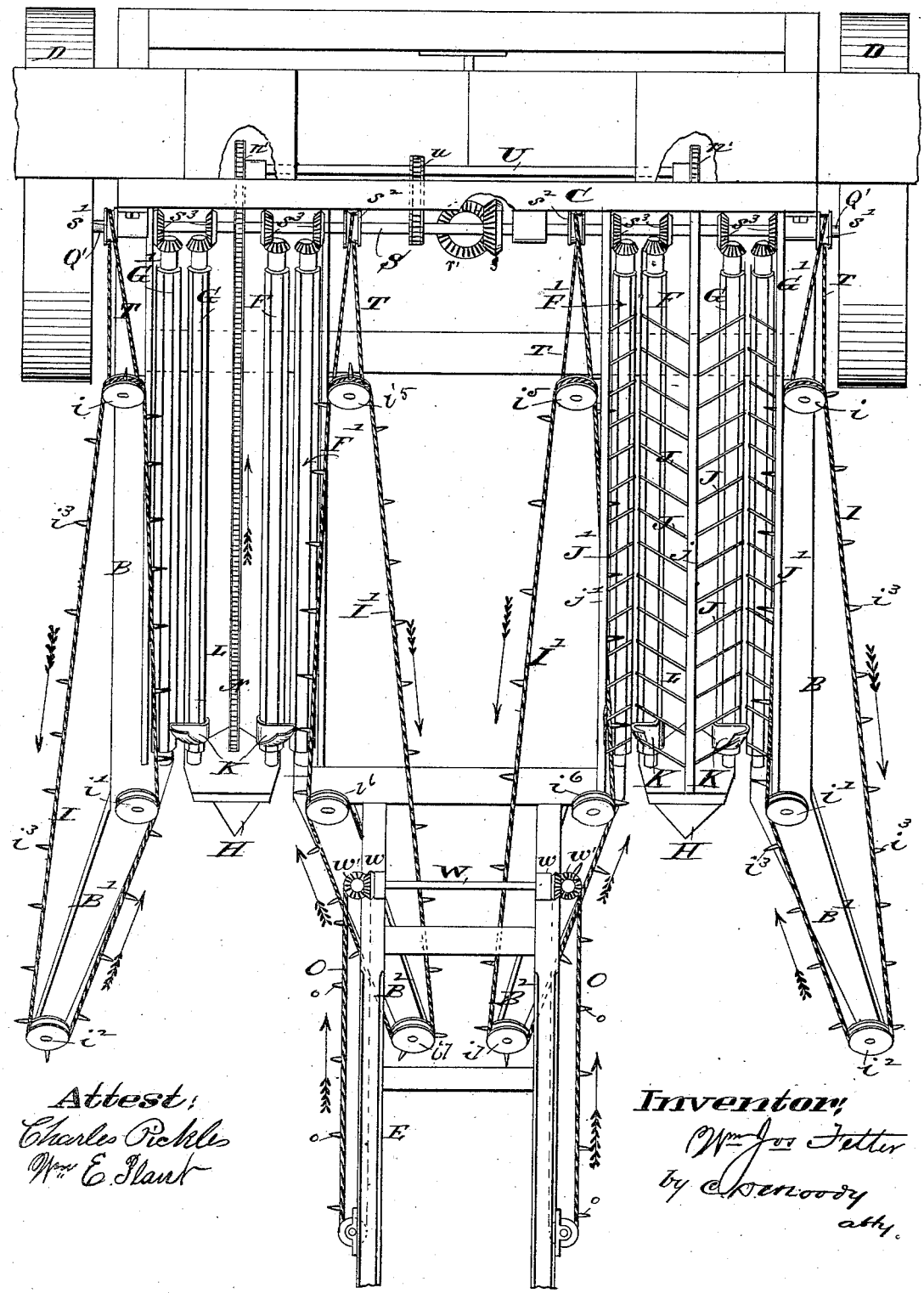

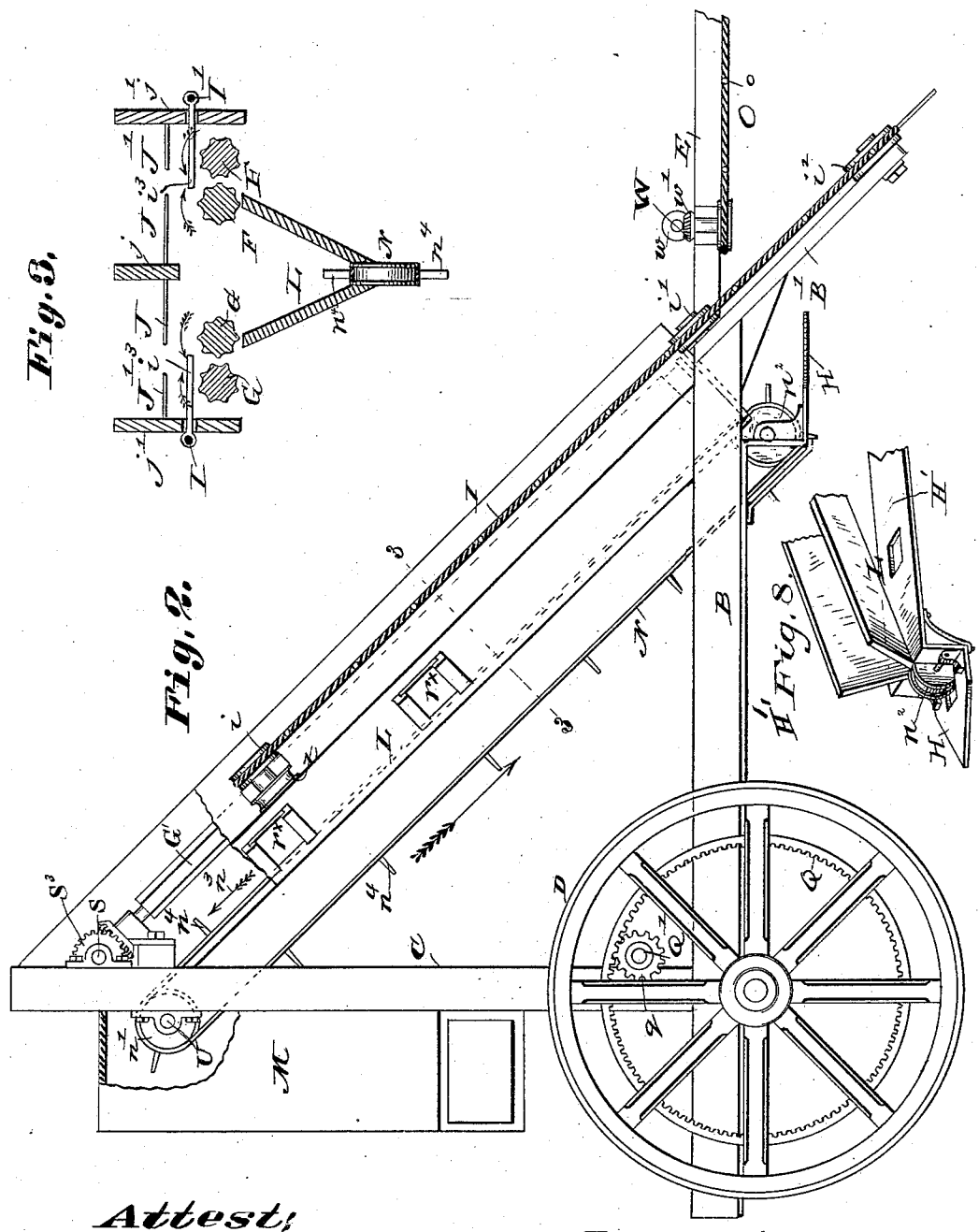

United States Patent Office.

WILLIAM JOS. FETTER, OF ST. LOUIS, MISSOURI, ASSIGNOR TO THOMAS S. RUTHERFURD, OF SAME PLACE.

CORN HARVESTING AND HUSKING MACHINE.

SPECIFICATION forming part of Letters Patent No. 307,108, dated October 28, 1884.

Application filed June 23, 1883. (No model.)

*To all whom it may concern:*

Be it known that I, WILLIAM JOS. FETTER, of St. Louis, Missouri, have made a new and useful Improvement in Corn Harvesting and Husking Machines, of which the following is a full, clear, and exact description, reference being had to the annexed drawings, making part of this specification, in which—

Figure 1 is a plan of the improved machine; Fig. 2, a side elevation; Fig. 3, a cross-section on the line 3 3 of Fig. 2; Fig. 4, a rear elevation, portions of the spouts being broken away; Fig. 5, a side elevation of the arm upon the thill or shaft; Fig. 6, a cross-section of a pair of the stripping-rolls and showing the deflector for lifting the ears from between the rolls and deflecting them into the trough beneath the rolls; Fig. 7, a plan of the part shown in Fig. 6, and Fig. 8 a detail showing how the front or lower end of the trough is supported.

The same letters of reference denote the same parts.

The object of my invention is to produce a machine adapted to harvest corn and husk the same in the field, wherein parallel husking-rolls are used; and it consists, essentially, in improvements which are especially applicable to stripping-rolls arranged in pairs. Preferably two pairs of rollers are employed for each row of corn, and hence for a machine such as the present for harvesting two rows at once there are four pairs of rolls. The rolls are all arranged longitudinally in the machine, inclined forward and downward, and are suitably journaled in the machine to enable the rolls in each pair to turn toward each other as the cornstalks pass between them. The rolls are positively actuated by gearing, which transmits motion from the driving-wheels to the rolls. As the machine advances the stalks pass between and through to the rear of the rolls. The rolls of each pair are near enough together to prevent the ears from passing between them, and they are preferably close enough to each other to grasp the stems of the ears. The effect, then, is to separate the corn from the stalks. The ears drop from above the rolls into a trough beneath, whence they are preferably transferred to the rear end of the machine and there delivered to and collected in a suitable receptacle.

Minor features of the machine are devices for lifting, straightening, and guiding the cornstalks to the rolls, for keeping the ears from falling between the rolls, and for deflecting the ears into the troughs.

The frame-work of the machine consists, substantially, of the horizontal part B, the upright part C, and the supporting-wheels D D', which are also the driving-wheels for operating the harvesting mechanism.

E represents the thills, between which the horse which draws the machine is harnessed.

F F' G G' represent two pairs of stripping-rolls on each side of the thills for the purpose of gathering the corn from the row at each side of the machine. One pair of rolls for a row of corn will sometimes suffice; but it is better to have two pairs, as shown, for each row, in which case a portion of the stalks in the row passes between the rolls F F' and a portion between the rolls G G'. The guide H serves to divide the row and deflect the parts in between the two pairs of rolls, respectively.

I represents chains, belts, or ropes carried around the pulleys $i$ $i'$ $i^2$ and provided with prongs, fingers, or projections $i^3$ $i^3$. These belts I are moved in the direction indicated by the arrows, and their functions are to catch, lift, straighten up, and direct the stalks so as to bring them to the rolls G G'. To enable these belts to act to better advantage the frame of the machine is extended at B' to support the pulleys $i^2$, around which pass the chains I. This enables the projections $i^3$ $i^3$ to act upon the stalks in the immediate vicinity of the ground, as well as higher up, and to straighten up stalks that are considerably inclined. Similar chains, I', pass around the sheaves $i^5$ $i^6$ $i^7$, and serve a similar purpose with relation to the inner pairs of rolls, F F'. The chains I I' are used upon each side of the machine. They extend just above and parallel with the stripping-rollers.

To prevent the silk or outer ends of the ears from dropping between the rolls a series of elastic bars, J J', are made to project from fixed parts $j$ $j'$ of the machine over the rolls, as shown in Figs. 1 and 3. The free ends of these bars are sufficiently apart to allow the stalks to pass, but are close enough to each other to prevent the ears from pointing between the rolls. If any of the ears after being separated should fall so as to rest between the rolls F and F' or G and G', they slide downward until they meet the deflector K, Figs. 1, 6, 7, by means of which they are raised from between the rolls and directed into the trough L. The deflectors K K are only intended for such ears as may catch and rest upon the rolls. The principal portion of the ears as they, by the action of the rolls, are stripped from the stalks will drop directly into the trough L, which is beneath the rolls F F' G G', Figs. 1, 2, and 3. The function of the trough is to receive the ears while they are transmitted to such a point in the machine as shall be convenient for collecting them. To this end the troughs are extended upward beneath and parallel with the rolls to the upright frame C, and are there connected with the spouts M M', Fig. 4, through which the ears are delivered into any receptacle—say, a wagon alongside—suitable for receiving them.

To remove the ears after they have dropped into the trough and elevate them into the spouts M M', the endless belt or chain N is employed. It is carried around the pulleys $n'$ $n^2$, and is moved in the direction indicated by the arrows. The upper part of the belt, as shown in Figs. 2 and 3, travels in the trough, and the projections $n^4$ $n^4$, with which the belt is furnished, (and which may be of any suitable shape therefor,) act to lift and carry along the ears and deliver them into the spouts M M'. These spouts, as shown, cross each other, and at their intersection a gate, $m$, is hinged, which may be turned to open either spout and deliver the ears to either, as desired. In the drawings the spout M' is closed to divert all the ears coming from both of the troughs L L into the spout M. The thills E are provided with belts O, having projections $o$ $o$, and adapted to travel as indicated by the arrows, for the purpose of straightening such stalks as may come in the line of the thills E and directing them into the field of the belts I' and toward the rolls F F'. The thills E are also furnished with the arms P, Fig. 5, for the purpose of lifting aside the stalks that may be depressed.

The various movable parts of the machine may be actuated in any desirable way. That shown is considered desirable. The wheels D D are provided with gear-wheels Q, Fig. 2. The counter-shaft Q', Figs. 2 and 4, is provided with pinions $q$, which engage with the gear-wheels Q Q and with the bevel-pinion $q'$, which engages with the bevel-pinions $r$ upon the upright shaft R. The bevel-pinion $r'$ upon the upper end of the shaft R engages with the pinion $s$ upon the horizontal shaft S. This last-named shaft is supplied with the pulleys $s'$ $s^2$ and the bevel-pinions $s^3$. The pinions $s^3$ engage directly with the bevel-gears upon the rolls F F' G G'. The belts T T lead from the pulleys $s'$ $s^2$ around pulleys $t$, Fig. 2, upon the same shafts that support the pulleys $i$ $i$. U represents another horizontal shaft driven by the belt $u$ from the shaft S. The shaft U supports the pulleys $n'$ $n'$ of the elevating-belts N N, which are thereby driven. A counter-shaft, W, upon the thills E, driven, say, by a belt from the shaft S, is provided with pinions $w$ $w$, which engage with pinions $w'$ $w'$ upon the shafts that carry the pulleys around which the belts O O are carried, and serving thereby to drive the belts O O.

The doors $r^2$ $r^2$, Fig. 2, in the side of the trough are for the purpose of dropping the corn into a receptacle immediately beneath the trough, when so desired.

I claim—

1. The combination of the bars J J', the belt I, the rolls G G', the receptacle L, and the elevating-belt N, substantially as described.

2. The combination of the bars J J', the belts I I', the rolls G G' F F', the receptacle L, and the elevating-belt N, substantially as described.

3. The combination of the bars J J', the belt I, having the projections $i^3$, and the rolls G G', substantially as described.

4. The combination of the bars J J' and the rolls G G', substantially as described.

5. The combination of an inclined V-shaped trough having a central endless conveyer, the side doors $r^2$, the gatherers, the guide H, and the husking-rolls having deflectors at or near their lower ends, all constructed and adapted to operate substantially in the manner and for the purposes described.

6. The combination of endless gathering-belts, an inclined trough, husking-rolls above said trough, an endless carrier in the bottom of the same, and a receiver for the ears of corn at its upper end, substantially as described.

7. The combination of endless gathering-belts I I', a trough, the husking-rolls, an endless carrier, N, a guide, H, and the endless gathering-belt O, applied to one of the thills E, substantially as described.

8. The combination of the frame B, having the forwardly-diverging extensions, the endless gathering-belts I I', the endless gathering-belt on one of the thills E, an inclined trough provided with an endless carrier, N, and the husking-rolls, substantially as described.

9. In combination with the corn-husking rolls, and a receptacle beneath the same, the overhanging yielding deflector K, adapted to guide ears of corn from between said rolls and direct them into the receptacle, substantially as described.

10. The combination of an inclined trough, an endless carrier in its bottom, husking-rolls arranged above said trough, and bars J J', arranged over these rolls, substantially as described.

11. The combination of an inclined trough, the husking-rolls above the same, the belt having prongs over said rolls, and the oblique elastic bars above said prongs, substantially as described.

12. The combination of the trough, the husking-rolls, the endless belts I I', having horizontal prongs, and arranged in a plane above said rolls and extending beyond the forward ends of the same, substantially as described.

13. The combination of the endless belts arranged in a plane above the husking-rolls, and provided with horizontal prongs, the inclined trough and the spurred carrier N, substantially as described.

14. The combination of the inclined troughs, the husking-rolls above said troughs, and endless belts I I', having horizontal prongs reaching over said rolls, substantially as described.

15. The combination of the inclined trough, the endless carrier N at the bottom thereof, the husking-rolls, the endless belts, having prongs above these rolls, and the bars J J' above said prongs, substantially as described.

Witness my hand this 21st of May, 1883.

WILLIAM JOS. FETTER.

Witnesses:
C. D. MOODY,
C. T. BISEN.